United States Patent Office 3,493,602
Patented Feb. 3, 1970

3,493,602
PROCESS FOR PREPARING PHENYL ALANINES
Laszlo Suranyi, Mannheim, and Richard Cyrus, Ludwigshafen (Rhine), Germany, assignors to Knoll A.-G., Ludwigshafen (Rhine), Germany
No Drawing. Filed Sept. 26, 1966, Ser. No. 581,738
Claims priority, application Germany, Sept. 30, 1965, K 57,272
Int. Cl. C07c 101/08
U.S. Cl. 260—471     9 Claims

ABSTRACT OF THE DISCLOSURE

Phenyl alanines are prepared by reacting a mono- or di-substituted acetoacetic acid ester of the formula:

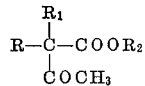

in which R is substituted or unsubstituted benzyl; $R_1$ is hydrogen or lower alkyl and $R_2$ is lower alkyl with hydrazoic acid or an alkali metal salt thereof.

This invention relates to esters of substituted N-acetyl racemic α-amino acids and hydrolysis products thereof having the formula

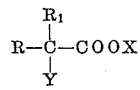

in which R is benzyl unsubstituted or substituted by one or more hydroxy, alkoxy, acetoxy, trifluoromethyl or alkyl groups of halogen atoms, $R_1$ is hydrogen or lower alkyl, X is hydrogen, lower alkyl or a monovalent metal cation, and Y is —NHCOCH₃ or NH₂·HAc, Ac being the anion of an inorganic acid, and to a process for preparing them.

It has already been proposed to convert substituted acetoacetic acid esters to substituted N-acetyl-α-amino acid esters with hydrazoic acid according to the so-called Schmidt reaction. Substituted aliphatic dicarboxylic acids are decomposed under similar conditions to α-amino acid derivatives.

The yields reported by K. F. Schmidt in "Berichten der Deutschen Chemischen Gesellschaft," vol. 57 (1924), page 704, were not based on specific working examples and could not be confirmed by later authors. This is particularly true of starting compounds substituted by benzyl or phenyl groups in α-position to the carboxyl groups. According to L. H. Briggs et al. "J. Chem. Soc." (1942), page 61, a yield of only 16% phenyl alanine is obtainable from benzyl malonic acid. M. Oesterlin found ("Angew. Chemie," vol. 45 (1932), page 536) that the yield of amino acid derivatives is reduced considerably when the starting material contains substituted phenyl groups.

According to "Organic Reactions" (1946) vol. 3, page 311, the Schmidt reaction is not useful with acids that are unstable to concentrated sulfuric acid.

It has now been found that it is possible to prepare esters of N-acetyl-substituted racemic α-amino acids of the formula

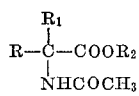

as well as the hydrolysis products thereof, in which R is benzyl unsubstituted or substituted by one or more hydroxy, alkoxy, acetoxy, trifluoromethyl or alkyl groups or halogen atoms, $R_1$ is hydrogen or lower alkyl and $R_2$ is lower alkyl, by reacting mono- or disubstituted acetoacetic acid esters of the formula

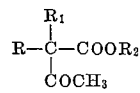

in which R, $R_1$ and $R_2$ have the same meanings, with hydrazoic acid or an alkali metal salt thereof, preferably in an inert solvent such as toluene, in the presence of concentrated sulfuric acid and an inert carrier material, such as kieselguhr, gypsum or clay at a temperature below 0° C. and, if desired, hydrolyzing the N-acetyl-α-amino acid ester thus obtained.

The starting acetoacetic acid esters may be the lower alkyl, e.g., methyl, ethyl, propyl or butyl esters and the α-carbon atoms may be monosubstituted by benzyl, mono- or di-lower alkoxy benzyl, mono- or dihydroxy benzyl, mono- or di-lower alkyl benzyl, mono- or diacetoxy benzyl, mono- or dihalo benzyl, mono- or di-trifluoromethyl benzyl, hydroxy-lower alkoxybenzyl acetoxy-lower alkoxybenzyl, or the like, or the α-carbon may be disubstituted, i.e, by a benzyl or substituted benzyl and by a lower alkyl, such as methyl or ethyl.

It has been found particularly advantageous to carry out the reaction with hydrazoic acid in the presence of sulfuric acid having a concentration of about 90% and kieselguhr as inert carrier material, and at a reaction temperature between about −10 and about −25° C.

Hydrolysis of the resulting N-acetyl-α-amino acid ester with an inorganic acid or alkali metal hydroxide takes place as follows:

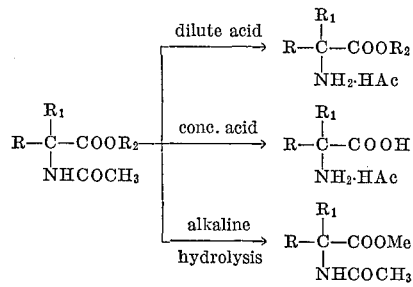

in which Ac is the anion of an inorganic acid, Me is a monovalent metal cation, and R, $R_1$ and $R_2$ are as defined previously.

When hydrolysis is undertaken with a dilute mineral acid, such as 1–2 N hydrochloric acid, the corresponding α-amino acid ester salt is obtained after 2 to 3 hours at elevated temperature. With concentrated acids, such as 3–5 N hydrochloric acid, salts of free α-amino acids are obtained at the boiling temperature of the mineral acid. Concentrated or dilute alkali-metal hydroxide solutions saponify only the ester groups and yield alkali salts of N-acetyl-α-amino acids.

By utilizing 48% hydrobromic acid at approximately its boiling temperature, it is possible to hydrolize alkoxybenzyl- and acetoxybenzyl-substituted N-acetyl-α-amino acid esters in such a way as to simultaneously obtain free phenolic hydroxyl groups, as illustrated in Example 2D.

The products of the invention have physiological activity and are also useful as intermediates for the preparation of therapeutically effective compounds such as α-methyldopa, a compound known to be effective for the treatment of hypertension or high blood pressure. They are particularly useful as anti-hypertonics and as decarboxylase inhibitors. Oral administration of a tablet containing about 0.25 gram of a compound of the invention is effective in providing relief from hypertension.

The invention is further illustrated in the following examples.

EXAMPLE 1

22 g. of the methyl ester of methyl-benzyl acetoacetic acid (M.P. 56–58° C.) are admixed with a solution of 5.16 g. hydrazoic acid in toluene. This mixture is added, dropwise in the course of one hour while stirring at −20 to −25° C., to a suspension of 115 g. kieselguhr and 60 g. 90% sulfuric acid in 420 ml. toluene. The reaction mixture is stirred for two hours at the same temperature and then 150 ml. chloroform and 150 g. ice are added. The kieselguhr is filtered off and washed throughly with chloroform. The toluene-chloroform layer is extracted with 1 N sodium hydroxide, washed with water, dried over sodium sulfate and evaporated to dryness. After washing, the crystalline residue is suction filtered with isopropyl ether and dried. The yield of the racemic methyl ester of N-acetyl-α-benzyl-α-alanine is 20.9 g. (89% theoretical) and the melting point, recrystallized from ethylacetate, is 118-120.5° C.

EXAMPLE 2

(A) 1250 ml. toluene and 650 ml. methylene chloride are added to 39 g. sodium azide in a three-necked flask. 45 g. of 65% sulfuric acid are added slowly while stirring vigorously. After liberation of hydrazoic acid, 400 g. kieselguhr are added, cooled to −10 to −20° C., and 294 g. concentrated sulfuric acid are added slowly to the reaction mixture. A mixture of 600 ml. methylene chloride and 133 g. methyl ester of methyl-3,4-dimethoxybenzyl acetoacetic acid is added dropwise within one hour. Stirring at the same temperature is continued for another 2½ hours. After addition of 5 g. acetone, 750 ml. ice water are added. The kieselguhr is filtered off and extracted with methylene chloride. The extract is combined with the toluene-methylene chloride layer of the filtrate, shaken with dilute sodium hydroxide, washed neutral with water, dehydrated with magnesium sulfate, and evaporated to dryness. The crystalline residue of racemic methyl ester of N-acetyl-α-(3,4-dimethoxybenzyl)-α-alanine is obtained, after stirring out with isopropyl ether and drying, in a yield of 265 g. (90% theoretical) and has a melting point, recrystallized from ethyl acetate, of 175–176° C.

(B) If the methyl ester is heated to a boil under reflux for several hours with 3 N hydrochloric acid and the solution is evaporated to dryness, a 96–98% yield of the hydrochloride of racemic α - (3,4-dimethoxybenzyl) - α-alanine is obtained. It has a melting point, with decomposition, at 237–240° C. after being dried over $P_2O_5$ under a vacuum.

(C) If the same reaction is carried out with 1 to 2 N hydrochloric acid on a water bath, the hydrochloride of the α-(3,4-dimethoxybenzyl)-α-alanine methyl ester (M.P. 156–158° C.) is obtained.

(D) If the N-acetyl-α-(3,4-dimethoxybenzyl)-α-alanine methyl ester is heated to a boil under reflux for several hours with 48% hydrobromic acid and then evaporated to dryness, a practically quantitative yield of the hydrobromide of α-(3,4-dihydroxybenzyl) - α - alanine is obtained. After separation from a suitable solvent, racemic α-(3,4-dihydroxybenzyl)-α-alanine (M.P. 296–198° C.) is obtained.

(E) By carrying out the hydrolysis of the N-acetyl-α-(3,4-dimethoxybenzyl)-α-alanine methyl ester at elevated temperature with about one equivalent of 1 N sodium hydroxide, a practically quantitative yield of racemic N-acetyl-α- (3,4-dimethoxybenzyl) -α-alanine (M.P. 213–215° C.) is obtained, after acidification.

The following racemic compounds were prepared similarly:

| Example | Starting material | Final product |
|---|---|---|
| 3 | Methyl ester of ethyl benzyl acetoacetic acid (viscous oil, B.P. at 0.08 mm.=80–82° C.). | Methyl ester of α-benzyl-α-acetamino butyric acid, M.P. 103–105° C. (from benzene). |
| 4 | Methyl ester of methyl o-chlorobenzyl acetoacetic acid, M.P. 42,–47° C. | Methyl ester of N-acetyl-α-(o-chlorobenzyl)-α-alanine M.P. 111.5, –113° C. (from benzene), yield 84%. |
| 5 | Methyl ester of 3,4-dimethoxybenzyl acetoacetic acid, M.P. 55–57° C. | Methyl ester of N-acetyl-β-(3,4-dimethoxyphenyl)-α-alanine, M.P. 108–110° C. (from benzene), yield 90%. |
| 6 | Methyl ester of methyl-(2,3-dimethoxybenzyl) acetoacetic acid, M.L. 70° C. | Methyl ester of N-acetyl-α-(2,3-dimethoxybenzyl)-α-alanine, M.P. 83.5–85° C., yield 74%. |
| 7 | Methyl ester of 3-methoxy-4-hydroxy-benzyl acetoacetic acid (viscous oil, B.P.0.01 mm. 135°C.). | Methyl ester oj N-acetyl-α-(3-methoxy-4-hydroxyphenyl)-α-alanine, M.P. 113–115.5° C. |
| 8 | Methyl ester of 3-methyl-(3-methoxy-4-acetoxybenzyl) acetoacetic acid, M.P. 84–85°C. | Methyl ester of N-acetyl-α-(3-methoxy-4-acetoxybenzyl)-α-alanine, M.P. 151–153° C. (from toluene), yield 86%. |
| 9 | Ethyl ester of methyl- (3,4-dimethoxybenzyl) acetoacetic acid. | Ethyl ester of N-acetyl-α-(3,4-dimethoxybenzyl)-α-alanine, M.P. 161–164 ° α-alanine, yield 89%. |
| 10 | Isopropyl ester of methyl-(3,4-dimethoxybenzyl)-acetoacetic acid | Isopropyl ester of N-acetyl-α-(3,4-dimethoxy-benzyl)-α-alanine, M.P. 141, 144° C., yield 78%. |
| 11 | n-Butyl ester of methyl-(3,4-dimethoxybenzyl)-acetoacetic acid. | n-Butyl ester of N-acetyl-α-(3,4-dimethoxybenzyl)-α-alanine, M.P. 121,–123° C., yield 86%. |
| 12 | Methyl ester of α-methyl-α-(p-methylbenzyl) acetoacetic acid. | Methyl ester of N-acetyl-α-(p-methylbenzyl)-α-alanine. |
| 13 | Methyl ester of α-methyl-α-(m-trifluoromethylbenzyl) acetoacetic acid. | Methyl ester of N-acetyl-α-(m-trifluoromethylbenzyl)-2-alanine. |

The claims:
1. Process for preparing a compound of the formula

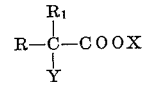

in which R is benzyl unsubstituted or substituted by one or more hydroxy, alkoxy, acetoxy, trifluoromethyl or alkyl groups or halogen atoms, $R_1$ is hydrogen or lower alkyl, X is hydrogen, lower alkyl or a monovalent metal cation, and Y is —NHCOCH$_3$ or —NH$_2$·HAc, Ac being the anion of an inorganic acid, which comprises reacting a mono- or di-substituted acetoacetic acid ester of the formula

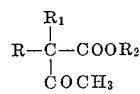

in which R and $R_1$ are as defined above and $R_2$ is lower alkyl, with hydrazoic acid or an alkali metal salt thereof in the presence of concentrated sulfuric acid and an inert carrier material at a temperature below about 0° C.

2. Process as defined in claim 1 wherein the temperature is between about −10 and about −25° C.

3. Process as defined in claim 1 wherein the carrier material is kieselguhr.

4. Process as defined in claim 1 wherein the N-acetyl-α-amino acid ester obtained by reaction with hydrazoic acid is subjected to hydrolysis.

5. Process as defined in claim 4 wherein the hydrolysis is carried out at elevated temperature with a dilute mineral acid.

6. Process as defined in claim 4 wherein the hydrolysis is carried out at elevated temperature with a concentrated mineral acid.

7. Process as defined in claim 4 wherein the hydrolysis is carried out at elevated temperature with hydrochloric acid.

8. Process as defined in claim 4 wherein the hydrolysis is carried out at elevated temperature with hydrobromic acid.

9. Process as defined in claim 4 wherein the hydrolysis is carried out at elevated tempearture with an alkali metal hydroxide.

References Cited

UNITED STATES PATENTS 2,868,818   1/1959   Pfister et al. _____ 260—519
3,344,023   9/1967   Reinhold et al. _____ 260—471

LORRAINE A. WEINBERGER, Primary Examiner

L. A. THAXTON, Assistant Examiner

U.S. Cl. X.R.

260—518, 519, 476, 473; 424—309, 319